United States Patent
Venna et al.

(10) Patent No.: US 8,576,909 B2
(45) Date of Patent: Nov. 5, 2013

(54) SYSTEM AND METHOD FOR MONITORING VIDEO PACKETS FOR QUANTIFYING VIDEO QUALITY

(75) Inventors: Nagarjuna Venna, Dracut, MA (US); Kaynam Hedayat, Newton, MA (US)

(73) Assignee: EXFO Service Assurance, Inc.

( * ) Notice: Subject to any disclaimer, the term of this patent is extended or adjusted under 35 U.S.C. 154(b) by 247 days.

(21) Appl. No.: 13/050,252

(22) Filed: Mar. 17, 2011

(65) Prior Publication Data
US 2011/0164140 A1    Jul. 7, 2011

Related U.S. Application Data

(62) Division of application No. 11/210,810, filed on Aug. 24, 2005, now Pat. No. 7,933,329.

(51) Int. Cl.
*H04N 7/12* (2006.01)

(52) U.S. Cl.
USPC ............ 375/240.11; 375/240.01; 375/240.08; 375/240.25; 375/240.26; 375/240.27

(58) Field of Classification Search
USPC .......................... 375/240.11, 240.01, 240.08, 375/240.25–240.27
See application file for complete search history.

(56) References Cited

U.S. PATENT DOCUMENTS

7,676,722 B2    3/2010    Setton et al.
2005/0201471 A1    9/2005    Hannuksela et al.

*Primary Examiner* — Geepy Pe
(74) *Attorney, Agent, or Firm* — Pierce Atwood LLP; Joseph M. Maraia (57) ABSTRACT

A system and method for monitoring a sequence of video packets for quantifying video quality includes a video picture monitor that accesses data in a header of a video packet included in the sequence of video packets. The header is separate from video content stored in the video packet. The video picture monitor also determines from the accessed data, a relationship between a portion of a picture included in the video packet and at least a portion of a picture included in another video packet. Both video packets are included in the sequence of video packets. This relationship indicates whether to use the video content stored in the first video packet to quantify video quality.

20 Claims, 6 Drawing Sheets

SYSTEM AND METHOD FOR MONITORING VIDEO PACKETS FOR QUANTIFYING VIDEO QUALITY

RELATED APPLICATION

This application is a divisional of U.S. application Ser. No. 11/210,810, filed Aug. 24, 2005. The entire teachings of the above application are incorporated herein by reference.

TECHNICAL FIELD

This disclosure relates to monitoring video packet transmission through a network and, more particularly, to detecting lost video packets to determine the affects on video quality.

BACKGROUND

As the amount of video content transmitted over networks increases, there is a growing need to monitor the quality of video content that is provided to end users. This is paramount in packet-based networks, such as the Internet, in which packets may not be delivered in a timely fashion or may be lost during delivery. By losing packets, the video provided to the end users may appear erratic or frozen for periods of time. To alert a video content provider to these periods of poor quality, the video content is monitored. Subjective, objective, or a combination of subjective and objective measurement techniques may be implemented for monitoring the video content. In general, subjective measurement techniques include human input and opinions whereas objective measurements are based on algorithms and methodologies that provide accurate and repeatable results. Since subjective measurements include one or more persons judging video quality, typically these techniques are considered impractical for measuring and assuring video quality in high volume situations. Consequently, the need for objective measurement algorithms and methodologies that are absent human intervention are in ever-increasing demand.

As mentioned above, as a sequence of video packets is sent from a source to one or more destinations, inevitably some of the packets are lost in route. To detect this packet loss, as each packet arrives at a destination, the packet may be accessed to retrieve a sequence number stored in the packet. This sequence number identifies the position that the packet is located in the sequence. By arranging the received packets based on these sequence numbers, the packet sequence may be reconstructed for presenting the video content to an end user.

In addition to losing video content, by losing individual video packets, one received video packet may be affected by the loss of another video packet. For example, video content stored in one video packet may be dependent upon video content stored in another video packet. Due to this inter-packet relationship, the video content of a received video packet may not be properly decoded if the received packet depends upon a lost video packet. Thus, even though a video packet has been received and designated as valid, by losing another video packet included in the same packet sequence, the video content stored in the received packet may be non-presentable to end users.

SUMMARY OF THE DISCLOSURE

In accordance with an aspect of the disclosure, a method of monitoring video packets includes accessing header data in one video packet that is included in a sequence of video packets. The header of the video packet is separate from video content stored in the video packet. The method also includes determining from the accessed data, a relationship between a portion of a picture included in the video packet and at least a portion of a picture included in another video packet that is included in the sequence of video packets. The relationship indicates whether to use a portion the video content stored in the first video packet.

In one embodiment, the method may further include determining from the accessed data, a relationship between a portion of the picture included in the first video packet and a portion of a picture included in a third video packet that is included in the sequence of video packets. The method may also include designating the video content portion of the first video packet as a lost or detected video packet due to the relationship between the picture portions included in the video packets. The method may also include designating the video content portion of the first video packet as a lost or detected due to the relationship between the picture portions and whether the second video packet has been lost or detected. Accessing the data in the header of one of the video packets may include identifying the type of picture contained in the video packet. Accessing the data in the portion of the header of the first video packet may includes identifying a macro-block contained in the first video packet. The portion of the second video packet may include an independent or dependent picture. The video packet may include an I-picture, a P-picture, or a B-picture. The method may also include designating a portion of another video packet (that is included in the sequence of video packets) as lost unless the video packet includes an I-picture. The portion of the picture in one packet and the portion of the picture in the second packet may be included in the same picture or in separate pictures. The portion of the picture may include a macro-block. The sequence of video packets may be received by a destination computer system or by a computer system that is not located at the destination of the sequence of video packets. The sequence of video packets may be compressed to comply with such compression formats as an MPEG format, an H.264 format, or a Window Media Video format.

In accordance with another aspect of the disclosure, a system for monitoring a sequence of video packets includes a video picture monitor that accesses data in a header of a video packet included in a sequence of video packets. The header is separate from video content stored in the video packet. The video picture monitor is also determines from the accessed data, a relationship between a portion of a picture included in the video packet and at least another portion of a picture included in another video packet that is included in the sequence of video packets. This relationship indicates whether to use a portion of the video content stored in the video packet.

In one embodiment, the video picture monitor may determine from the accessed data, a relationship between a portion of the picture included in the first video packet and a portion of a picture included in a third video packet that is included in the sequence of video packets. The video picture monitor may designate the portion of the first video packet as a lost or detected video packet due to the relationship between the picture portions included in the video packets. The video picture monitor may also designate the portion of the first video packet as a lost or detected video packet due to the relationship between the picture portions and whether the second video packet has been lost or detected. Accessing the data in the header of one of the video packets may include identifying the type of picture contained in the video packet.

To access the data in the portion of the header of the first video packet, the video picture monitor may identify a macro-block contained in the first video packet. The portion of the picture in the second video packet may include an independent picture or a dependent picture. The video packet may include an I-picture, a P-picture, or a B-picture. The video picture monitor may also designate a portion of another video packet (that is included in the sequence of video packets) as lost unless the video packet includes an I-picture. The portion of the picture in the first packet and the portion of the picture in the second packet may be included in the same or separate pictures. The portion of the picture in the first packet may include a macro-block. The sequence of video packets may be received by a destination computer system or by a computer system that is not located at the destination of the sequence of video packets. The sequence of video packets may be compressed to comply with such compression formats as an MPEG format, an H.264 format, or a Window Media Video format.

In accordance with another aspect of the disclosure, a computer program product residing on a computer readable medium has stored instructions that when executed by a processor, cause the processor to access data in a header of a video packet included in a sequence of video packets. The header is separate from video content stored in the video packet. The executed instructions also cause the processor to determine from the accessed data, a relationship between a portion of a picture included in the video packet and at least another portion of a picture included in another video packet that is included in the sequence of video packets. The relationship indicates whether to use a portion of the video content stored in the first video packet.

In one embodiment, the computer program product may include further instructions to designate the portion of the video packet as a lost or detected based on the relationship between the picture portions included in the video packets. The computer program product may include further instructions to designate the portion of the first video packet as lost or detected video packet based on the relationship between the picture portions included in the video packets and the absence or detection of the other video packet. Accessing the data in the header of the video packet may include identifying the type of picture contained in the video packet. The computer program product may further include instructions to designate a portion of another video packet included in the sequence of video packets as lost unless the video packet includes an I-picture. The sequence of video packets may be received by a destination computer system or a computer system that is not located at the destination of the sequence of video packets.

In accordance with another aspect of the disclosure, a system and method for quantifying an end user experience of a video session includes a video picture monitor that designates a figure of merit to the video session. The figure of merit is determined from a group of factors that includes a count of lost video content. To determined the lost packet content, the video picture monitor accesses data in a portion of a header of a first video packet included in a sequence of video packets. The sequence of video packets is associated with the video session. The header is separate from the video content stored in the first video packet. The video picture monitor also determines from the accessed data, a relationship between a portion of a picture included in the first video packet and at least a portion of a picture included in another video packet included in the sequence of video packets. The relationship indicates whether to designate a portion of the video content stored in the first video packet as lost.

In one embodiment, the group of factors may further include additional factor such as a factor that represents latency associated with the sequence of video packets and/or a factor that represents jitter associated with the sequence of video packets.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE EMBODIMENTS

Figure 1:
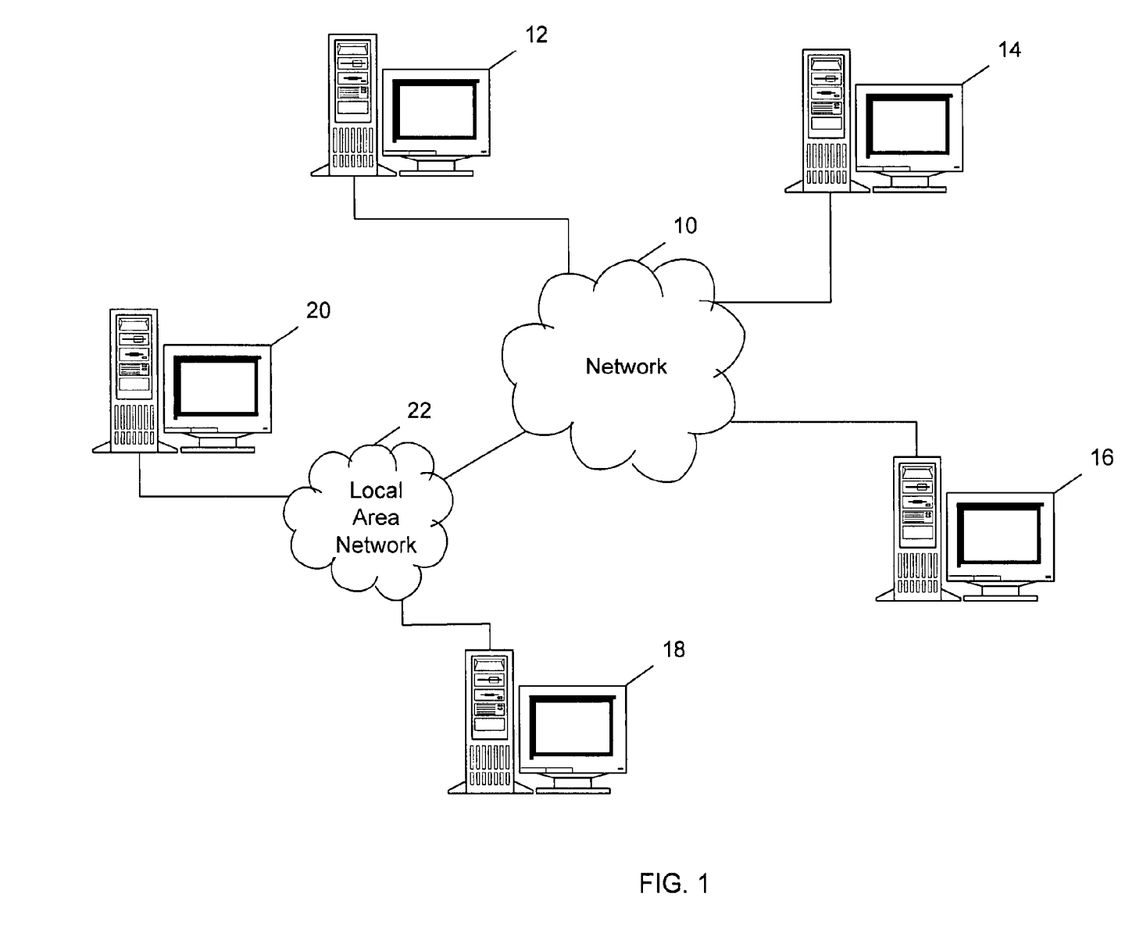
FIG. 1 is a block diagram representing a network of computer systems configured to transmit and receive video packets.

Referring to FIG. 1, a network 10 (e.g., the Internet, a wide—area network (WAN), etc.) allows a group of computer systems 12, 14, and 16 to share video content by transmitting and/or receiving video packets. In this exemplary network, computer systems 12-16 are connected to network 10 via hardwire connections, however in other arrangements wireless technology (e.g., radio frequency (RF), infrared (IR), etc.) may be implemented to provide connectivity. Additionally, network 10 may be connected to one or more other networks for further propagation of the video content. To illustrate this network scalability, additional computer systems 18 and 20 are connected by a local area network (LAN) 22 to network 10. As is known to one skilled in the art of network design and network applications, various types of equipment (e.g., routers, switches, etc.) and methodologies (e.g., video-teleconferencing applications) may be implemented for sharing video content. Additionally, while desktop computer systems are shown connected to network 10 (and LAN 22), in other arrangements computer systems 12-20 may include laptop computer systems, personal digital assistants (PDA), cellular telephones or other types of devices capable of transmitting and presenting video content.

Figure 2:
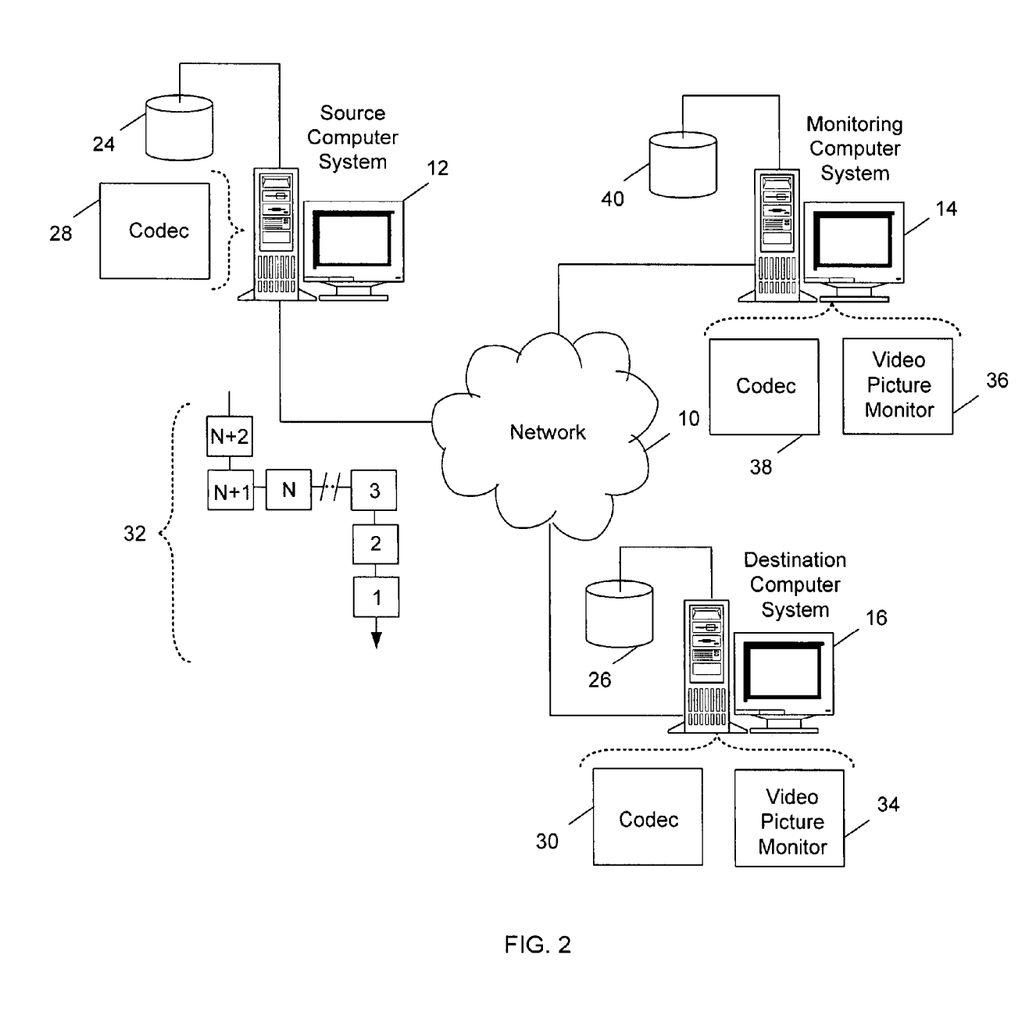
FIG. 2 is a block diagram that represents monitoring a sequence of video packets that is transmitted between a source and a destination computer system included in FIG. 1.

Referring to FIG. 2, some of the computer systems connected to network 10 are presented to illustrate the transmission and delivery of video content through the network. In this exemplary arrangement, computer system 12 transmits video content through network 10 for reception at computer system 16. Various types of applications may call for such video transmissions, for example, a video-on-demand (VOD) system may be implemented to provide video content that is stored on a storage device 24 associated with computer system 12. Along with transmitting video content for uni-directional applications, video content may also be bi-directionally transmitted among two or more computer systems. For example, video content (along with audio content) may be transmitted in a bi-directional fashion for a video teleconference application.

To transmit the video content between the computer systems the content is segmented and stored in a sequence of discrete packets. Along with segmenting, the video content may be compressed to alleviate the need for relatively high data transfer rates and large storage capacity. Upon receipt, the compressed video content may be de-compressed for presentation or stored on a storage device 26 for retrieval and presenting at a later time. To provide this compression and decompression functionality, computer systems 12 and 16 include respective Coder/Decoders (codec) 28 and 30. These codecs may be implemented in hardware, software, or a combination hardware and software. For example, dedicated hardware codecs are available either as add-in computer cards or are integrated into video cards. Typically hardware-implemented codecs reduce the computing load on the central processing unit (CPU) of a computer system, thereby allowing the computer system to perform other tasks.

Codecs 28 and 30 may be configured to compress and decompress video content into one or more formats that are known to one skilled in the art of data compression and decompression. For example, formats defined by the motion picture experts group (MPEG) (e.g., MPEG-1, MPEG-2, MPEG-4, etc.) including MPEG-4 part 10, also known as MPEG-4 Advanced Video Coding (AVC) or H.264 may be implemented. Other formats such as Windows Media Video (MWV-9) or Windows Media Video Professional (WMV-9 Pro) may be implemented as a compression scheme.

To illustrate transmission of segmented and compressed video content, a sequence of video packets 32 is shown propagating from computer system 12 to network 10. In this example the packets are transmitted for a uni-directional application (e.g., VOD) from the source computer system to a destination computer system (i.e., computer system 16). As packet sequence 32 propagates to network 10 and onto computer system 16, individual video packets or groups of video packets may be lost or corrupted while in transit. By losing some of the packets, the video content that is stored in these packets is also lost. Thereby, when the video content is decompressed and reordered, all of the originally transmitted video may not be present at the destination computer system. Due to this lost content, the presented video may appear jerky or temperately frozen for periods of time.

Typically, for uni-directional and bi-directional video transmitting applications, personnel located at the source of the video content and end users located at one or more destinations of the video content are interested in quality of the provided video service. For example, video sequence 32 may originate at a VOD service provider (e.g., a cable television station) that provides video content (e.g., movies, sporting events, etc.) to subscribers. In order to retain current subscribers and attract future ones, the service provider may be interested in quantifying the quality of the video session. For example, to quantify the video quality, a figure of merit may be determined that represents the amount of video content lost in transmission (along with other factors). By comparing the number of lost (or non-lost) packets to total packets sent, this measure of quality may be quantified. To gain an accurate count of lost video and an understanding of the viewing experience provided to an end user, video packets may be monitored as they are received at the destination. For example, computer system 16 includes a video picture monitor 34 that monitors the video packets received by the computer system. By interrogating the packets, the number of lost packets may be determined and used to quantitatively describe the viewer experience. Once determined, the number of lost packets may be provided to the VOD service provider so that corrective steps may be taken to improve the provided video quality. Along with improved customer care, a service provider may provide better performance assurance.

Along with monitoring the end user experience to improve video services, video packet monitoring may also be performed at other locations between the source and the one or more destinations. For example, if the video presented to an end user is below a pre-defined quality standard, the video sequence may be monitored at one or more points along the transmission path between the source and the destination sites. By monitoring at one or multiple points along the transmission path, the approximate location or locations of the transmission disturbance may be identified and potentially corrected. This trouble-shooting functionality may be executed by the same entity that provides the video content (e.g., a VOD service provider) from the source computer system. Alternatively, a separate business entity may monitor the video quality for uni-directional or bi-directional video transmission applications (e.g., video-teleconferencing). By monitoring video packet sequences at the source, one or more destinations, or points between, the separate business entity or entities could generate revenue by charging a subscription fee to the video content source and/or end users.

In this illustrative arrangement, the trouble-shooting capability is provided by computer system 14 that is also connected (directly or indirectly) to network 10. By monitoring one or more points along the transmission path (e.g., from source computer system 12, through network 10, to destination computer system 16), computer system 14 may isolate particular locations where video packets are lost during transmission. To detect packet loss, computer system 14 includes a video picture monitor 36. Similar to video picture monitor 34 (included in computer system 16), video picture monitor 36 may be implemented in hardware or software (or a combination or hardware and software). Additionally, to decompress the video packets being monitored (and also to provide a packet compression capability), monitoring computer system 14 also includes a codec 38. For storing information such as lost packet amounts and statistics, a storage device 40 (e.g., hard drive, compact disc writer, etc.) is in communication with computer system 14.

In this particular arrangement video packet sequence 32 is provided from a single source (i.e., computer system 12), however, in some arrangements the packet sequence may arrive at the one or more destinations from multiple sources. Also, in this example the video content provided from computer system 12 contains actual video content for presenting to an end user. However, in some arrangements video packet sequence 32 may contain video content that is specifically produced and tailored for testing one or more transmission paths between the source and destination(s).

Figure 3:
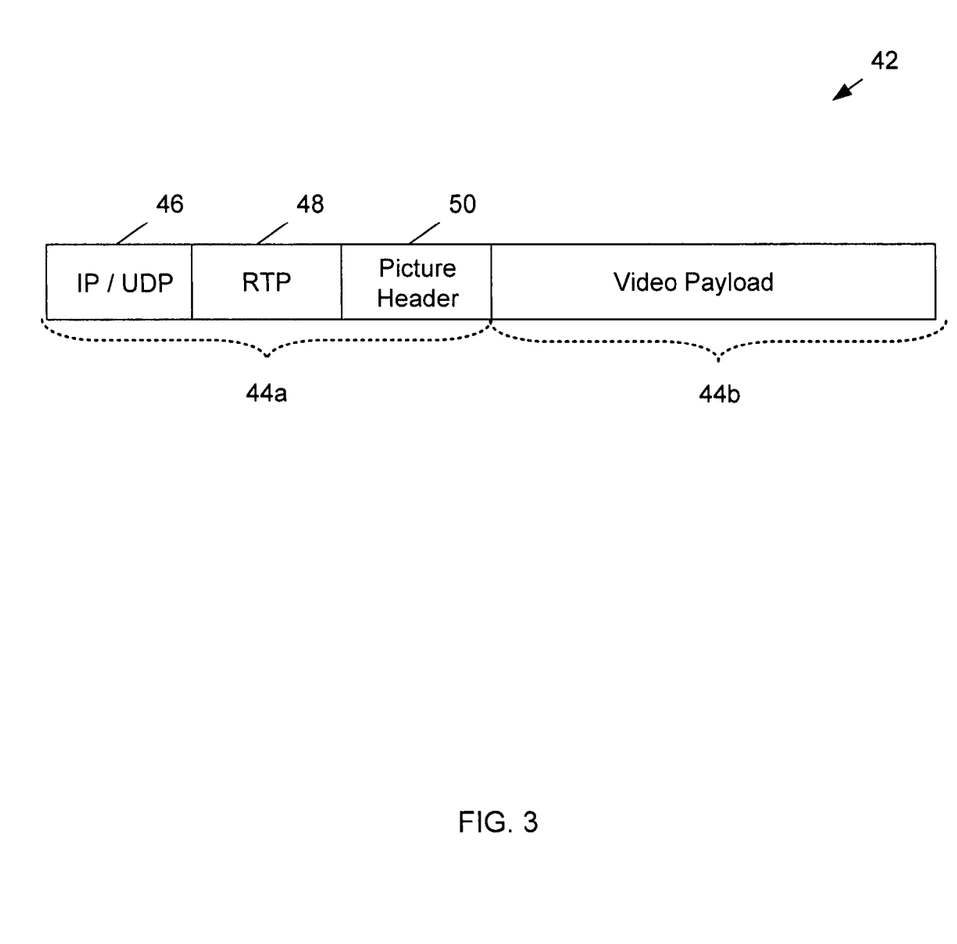
FIG. 3 is a diagram representing portions of one video packet that is included in the sequence of video packets shown in FIG. 2.

Referring to FIG. 3, a block diagram is shown that represents the contents of an exemplary video packet 42 that may be included in packet sequence 32. In general, video packet 42 includes a header portion 44a and a video payload portion 44b. Header portion 44a includes information such as data that identifies which sequence video packet 42 is included and the relationship between the video packet and other video packets included in the sequence. Video payload portion 44b includes data that represents the video content being transported by the video packet 42. Additionally, to transmit the video content at a reasonably attainable data rate, video packet 42 may be compressed using one or more compression schemes (e.g., MPEG-1, etc.).

In exemplary video packet 42, header portion 44a is segmented into multiple sections. Section 46 of the header contains data for implementing and complying with the User Datagram Protocol (UDP) and the Internet Protocol (IP). Typically video and audio packet streaming applications (e.g., VOD, videoconferencing, voice-over-IP (VoIP), etc.) implement UDP since this protocol does not retransmit erroneous or dropped packets. Under UDP, video packets are transmitted once, thereby, UDP is "connectionless" and does not execute a handshake to start a session. Header 44 also includes a section 48 that contains data for complying with the Real-Time Transport Protocol (RTP). RTP is an Internet protocol standard that provides rules and methodologies for managing the real-time transmission of multimedia data for uni-cast or multicast applications. RTP section 48 stores information such as data that identifies the source of the video packet and type of encoding applied to the contents of video payload 44b. The RTP segment also includes a timestamp that is used to determine the presentation time and jitter of the video content presented to the end user. Markers are also stored in the RTP segment for defining the beginning and end of a video picture that is encapsulated in multiple packets. Of particular interest for this application, RTP section 48 includes a number for identifying the location of the packet with respect to other packets in the video packet sequence. By tracking these packet locations, a conventional packet monitoring system may determine if one or more packets have been lost or delayed in transit.

As mentioned above, video packet 42 maybe compressed so that the content may be transmitted at a data rate supportable by the source and destination computer systems along with the network that connects the computer systems. For example, compression techniques such as one of the MPEG formats may be implemented to reduce the data needed to represent a video picture or portion of a video picture stored in each packet. In general, MPEG achieves high compression rates by storing visual changes from one picture to another, instead of storing an entire picture in each packet. The video information is then encoded by an algorithm such as the discrete cosine transform (DCT) to reduce the data needed to represent a video picture or portion of a video picture. Additionally, techniques used to predict the contents of later video pictures, known as motion compensation, may be implemented to reduce the amount of data needed for transmission. Portion 50 of header 44a (labeled as video header) includes data that may be used to identify the relationship between the video content stored in video packet 42 and video content stored in one or more other packets. In some arrangements, to identify these inter-packet relationships, three types of video pictures may be stored in each video packet.

The first of the three picture types is an "Intra coded" picture (also known as an I-picture). An I-picture is an independent picture in the sense that it does not reference video content of another picture in a sequence of video pictures. Since I-pictures are independent, a decoder typically starts decoding a video sequence with an I-picture and not with another type of picture. Thereby, to provide starting points, I-pictures are typically inserted every 12 to 15 pictures of a video sequence.

The second type of video picture is a "Predicted" picture (also known as a P-picture). A P-picture is encoded to include content that represents the differences between the video content of the P-picture and an I or another P-picture that are located earlier (e.g., directly before) in the packet sequence. A new P-picture is encoded by taking a previous I or P picture and predicting the values of each new pixel included in the new picture. Since P-pictures represent differences in the picture pixels, typically these pictures have larger compression ratios compared to I-pictures. The third type of picture is a "Bidirectional" picture (also known as a B-picture). B-pictures use prediction in a manner similar to P-pictures, however, B-pictures may be related to an I or P-picture located in a previous position within the sequence and a P-picture located after the B-picture. Since B-pictures may need both previous and subsequent pictures for appropriate decoding, the order in which the pictures are accessed is not the same as the order for presentation. This provides improved compression compared to P-pictures.

Figure 4:
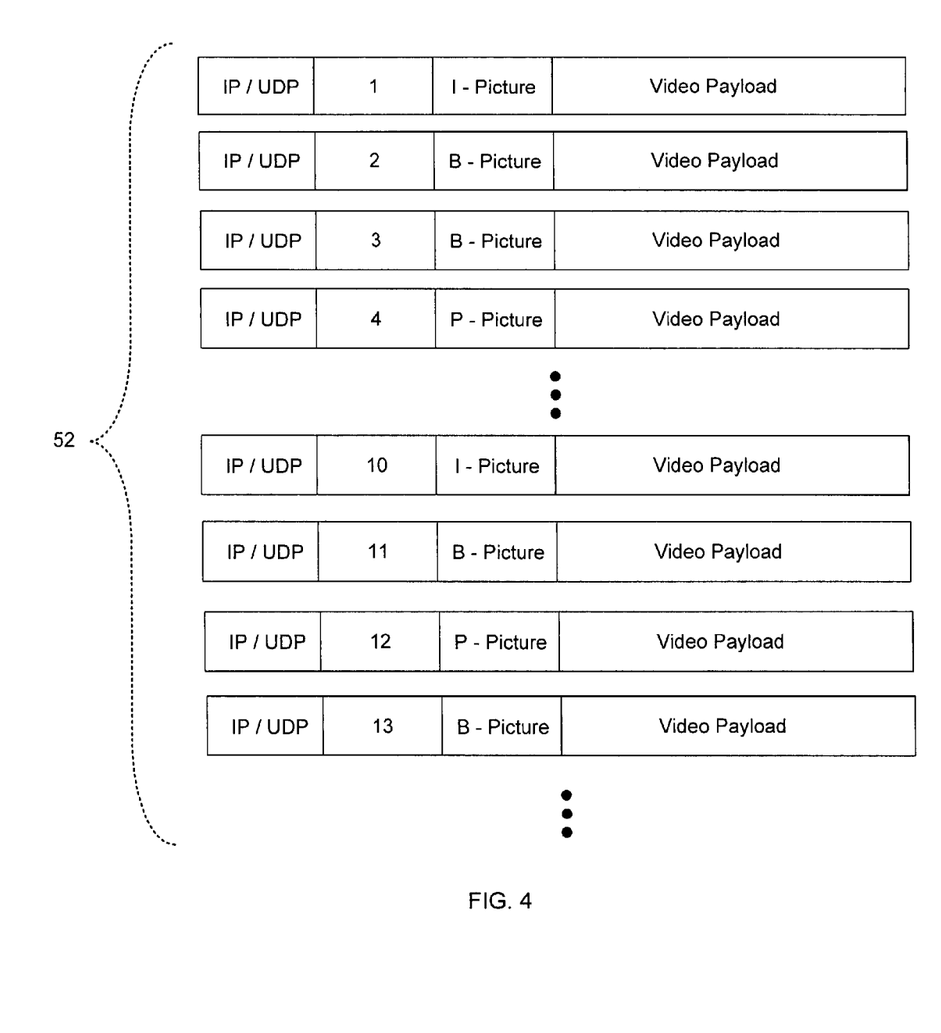
FIG. 4 is a diagram representing some of the video packets included in the sequence of video packets shown in FIG. 2.

Referring FIG. 4, a sequence of video packets 52 is represented by a series of individual blocks that represent each video packet. Similar to the video packet shown in FIG. 3, each block represents one video packet that includes a header portion and stores video content in a video payload portion. Each video packet header includes an assigned integer number to order the video packets into a sequence for displaying their contents to an end user. The figure shows an integer number in the RTP portion of each header to identify its position in the sequence. For illustrative purposes, the integers increment by one in this example, however, the video packets may also be received out of order and reassembled at the destination computer system. Additionally, in this illustration, each picture is completely encoded in a single video packet and each video packet contains a single picture.

Along with storing the integer numbers to identify the sequence order, each video packet contains data that identifies the type of picture stored in the packet. Similar to video packet 42 shown in FIG. 3, a portion of each video packet header includes data that identifies if the video picture is an I-picture, a B-picture, or a P-picture. Due to the inter-packet relationships based on the picture types, the picture types are typically interwoven into the video packets to produce a packet sequence with a deterministic pattern. For example, after an initial I-picture, B-pictures and P-pictures may be inserted in an alternating fashion (e.g., I-picture, B-picture, P-picture, B-picture, P-picture, etc.). In a similar scenario, multiple B-pictures may be inserted between single P-pictures (e.g., I-picture, B-picture, B-picture, P-picture, B-picture, B-picture, P-picture, etc.). This later exemplary pattern may be compressed at a higher compression ratio than the former interweaving pattern.

As video packet sequence 52 transits from the source computer system (e.g., computer system 12) to the one or more destination computer systems (e.g., computer system 16), some of the packets may be lost. Packet loss may also be caused by a network device that interacts with the video packets as they transit from the source to the destination(s). For example, packet sequence 52 may experience one or more queues during transmission. If these queues have a relatively small size, one or more of the packets may be lost based on the size of the packets and the size of the queues. Correspondingly the video content stored in the packets is lost. Even though portions of the overall video content may be lost, the video content received at the one or more destination computer systems may still be presented to the end user(s). So, while packet loss may not halt presentation of the packets received, the lost content may cause the presented video content to appear degraded. Further, as the number of lost video packets increases, the viewing experience of the end user continues to degrade until the video content is undecipherable.

By monitoring the video sequences received at the destination computer systems, the amount of packet lass can be quantified and used as an alert to indicate that the viewing experience has degraded below what a reasonable end user would expect or more importantly would purchase or continue a subscription. Along with quantifying packet loss, other parameters may be produced to quantify the viewing experience of the end user. For example, packet latency may be quantified to characterize time delay due to codecs, encoders/decoders, stacks (e.g., transmitter stack, receiver stack, queuing delay, etc.), networks, applications executed on the source computer system and/or destination computer system(s), or other hardware or software associated with the transmission of video packet sequence 52.

To determine the amount of lost video packets, a conventional packet monitoring system may access the header portion of each video packet received at one or more of the destination computer systems. By accessing the contents of each header, the conventional packet monitoring system can determine if a previously sent packet was lost during transmission. In particular, by interrogating the RTP portion of each header, the conventional packet monitoring system can appropriately order the received video packets to produce the packet sequence. Gaps in the packet sequence may then be detected to indicate the number of lost video packets and their locations in the sequence. Along with quantifying packet loss, other metrics such as packet latency and jitter may be quantified to characterize the viewing experience being presented to the end user(s).

By accessing the RTP header portion of the video packets, a relatively accurate count of lost packets may be determined. However, due to dependence between pictures, some properly received video packets may still be unusable if a related video packet is lost in transmission. As mentioned above, a P-picture may be produced that references content stored in an I-picture or another P-picture. Furthermore, a B-picture may reference content contained in two previous pictures for decoding its video content. Based on these inter-packet relationships, if an I-picture is lost in transmission, P-pictures and B-pictures that are located in positions subsequent to the lost I-picture (and reference the I-picture) may not properly decode. So, the video packets that contain these subsequent P-pictures and B-pictures may also be designated as lost since the contained pictures may not properly decode. Once the next video packet containing an I-picture is detected, video packets containing P-pictures and B-pictures (that reference the content of this I-picture) may be properly decoded.

Similarly, if a video packet containing a P-picture is lost, all subsequent P-pictures and B-pictures (that reference this P-picture) are designated as lost. Once another I-picture is detected (e.g., to start another sequence), subsequent P-pictures and B-pictures that reference the I-picture may be designated as detected. So by determining the relationship among the pictures included in the video packets, a more accurate count of lost video packets is provided. Additionally, this improved accuracy is determined by accessing information contained in the header portion of the video packets. Since each video packet header is relatively small in size (e.g., number of bytes), the information may be quickly retrieved. This provides a light weight mechanism to determine the quality of user experience without having to decode the actual video content.

Figure 5:
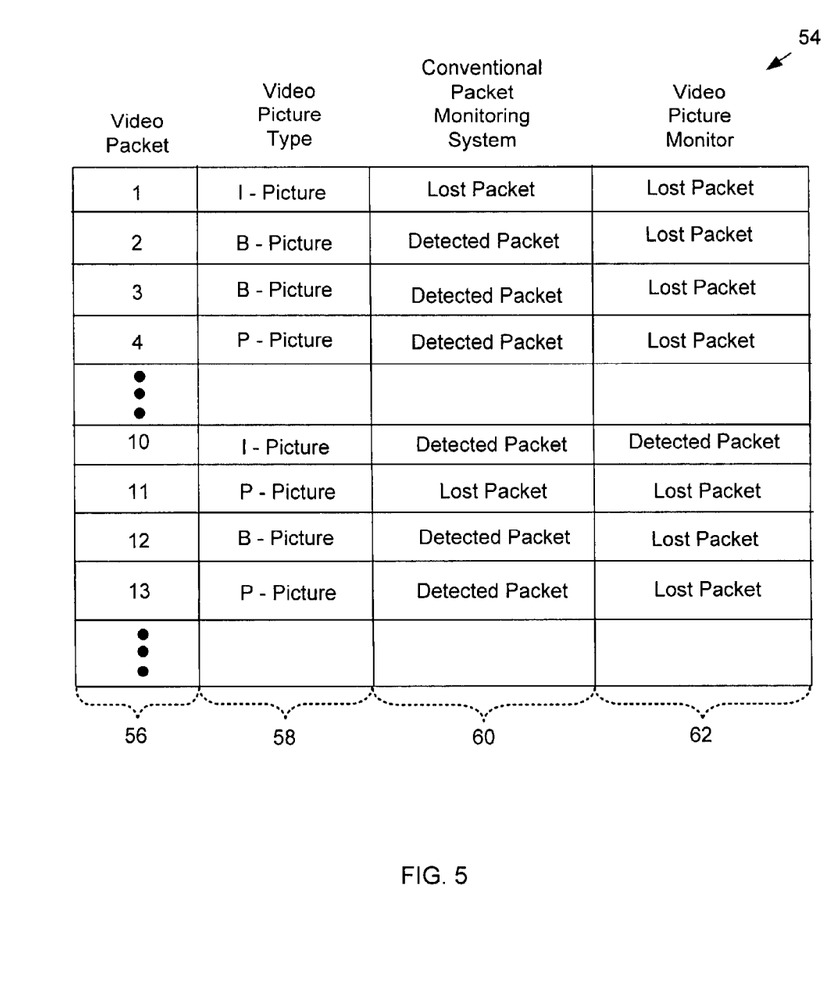
FIG. 5 is a chart that compares a conventional packet monitoring system and a video picture monitor that identifies inter-packet relationships.

Referring to FIG. 5, a chart 54 is presented that compares a conventional packet monitoring system to a video picture monitor such as video picture monitors 34 and 36 (shown in FIG. 3). While the conventional packet monitoring system designates a video packet as lost if it does not arrive at a destination computer system, the video picture monitor additionally identifies and uses inter-picture relationships to determine if a picture (or a portion of a picture) in a received packet should be designated as lost or detected. Columns 56 and 58 of chart 54 identify the individual packets included in exemplary video packet sequence 52 (shown in FIG. 4) and the type of pictures included in each video packet. Chart 54 also includes a column 60 that identifies if the corresponding video packet is designated as lost or detected by the conventional packet monitoring system. Similarly, column 62 identifies if the packet is designated as lost or detected by the video picture monitor that incorporates inter-picture relationships into its determinations.

For illustrative purposes video packets 1 and 11 have been designated as being lost during transmission from a source computer system (e.g., computer system 12) to a destination computer system (e.g., computer system 16). In contrast video packets 2-4, 10, 12 and 13 are designated as not lost and as being received by the destination computer system. As shown in column 60, the conventional packet monitoring system identifies packets 1 and 11 as lost due to respective gaps in the sequence of received video packets. Also, the conventional packet monitoring system designates packets 2-4, 10, 12 and 13 as detected packets since the packets are properly received by the destination computer system. However, since the conventional packet monitoring system does not account for inter-picture relationships, relational affects of lost packets 1 and 11 are not identified or used to determine if the received packets are decodable.

As shown in column 62, the video picture monitor identifies inter-picture relationships and uses the relationships to designate the picture (or portion of the picture) in the video packets as lost or detected. Similar to the conventional packet monitoring system, in this example the video picture monitor determines that packets 1 and 11 are lost since neither is received by the destination computer system. Due to the lost video packets, gaps appear in the sequence of received video packets. However, in contrast to the conventional packet monitoring system, the video picture monitor determines from the received video packets (e.g., packets 2-4) that lost video packet 1 contains an I-picture. Additionally video packets 2, 3, and 4 are respectively identified as B and P pictures from the picture type information stored in the packet headers. Each of packets 2, 3, and 4 relate directly or indirectly to the missing I-picture (video packet 1) and none of these packets contain an I-picture. Since packets 2, 3, and 4 reference the contents of lost I-picture packet 1, the video picture monitor designates each of these packets as lost. Furthermore, although not shown in chart 54, packets 5-9 would also be designated by the video picture monitor as lost unless one or more of these subsequent packets contains an I-picture.

Similar to the conventional packet monitoring system, the video picture monitor identifies and designates packet 10 as a detected packet and packet 11 as lost since the packet was not received by the destination computer system. However, while the conventional packet monitoring system designated the subsequently received packets (e.g., packets 11, 12, and 13) as detected, the video picture monitor uses the inter-picture relationships between packet 11 and the subsequent packets to determine their designations. From header data contained in one or more of these subsequent packets (e.g., video packet 12, video packet 13, etc.), the video picture monitor determines that packet 11 contains a P-picture. Thus, if a dependent video packet following packet 11 contains a P-picture or a B-picture, the video content contained in either type of these video packets may not be correctly decoded. So, after a P-picture is designated as lost, each subsequent, dependent video packet containing a P-picture or a B-picture is designated as lost until a video packet containing an I-picture is detected. In this example, the video picture monitor designates video packet 12 and video packet 13 as lost since each respectively contains a B-picture or a P-picture that reference the lost packet 11. Once a video packet is detected that contains an I-picture, the video picture monitor designates that packet as detected and continues monitoring subsequent video packets applying the rules described above.

Along with being lost in transmission, designating a video packet as lost or detected may depend upon a timely receipt of the video packet. For example, the conventional packet monitoring system may designate the content (or a portion of the content) of a video packet as lost if the packet is received later than a predefined arrival time threshold at the destination computer system. If this late arriving video packet contains an I-picture or a P-picture, subsequent video packets may not be correctly decoded since the I-picture or P-picture content is unavailable due to the discarded packet. In contrast, since the video picture monitor determines the type of picture contained in a video packet, a late arriving video packet may be interrogated to determine the picture contained in the packet. If the picture is identified as an I-picture or P-picture, the video picture monitor may use this video packet based on inter-picture relationships with pictures in other video packets. Along with weighting delayed video packets based on picture type, different types of video packets and packet loss at different locations may also be weighted.

In the above-described exemplary video picture monitor, the header of each video packet was accessed to determine if the packet contained an I-picture, a P-picture, or a B-picture. Using this information the video picture monitor determines the relationship of the content stored in the video packets. However, rather than determining the relationship among pictures, in some arrangements, the video picture monitor may determine relationships among portions of one or more pictures. For example, in compression formats such as H.264 (also known as MPEG-4 Part 10) a picture is segmented into portions that are typically referred to as macro-blocks. Similar to the I, B, and P pictures, the video content of two or more macro-blocks may be related. Additionally, macro-blocks included in the same or different pictures may be related. So rather than determining inter-picture relationships, the video picture monitor may determine inter-macro-block relationships.

Similar to the above-mentioned MPEG compression formats, the H.264 standard, which was produced by the ITU-T Video Coding Experts Group (VCEG) and the ISO/IEC Moving Picture Experts Group (MPEG), also uses three picture types (i.e., I-picture, P-picture, and B-picture). However, the H.264 format incorporates a data field in each video packet header to store data that represents the relationship of the macro-block stored in the video packet and macro-block contained in another video packet or the same packet. For example, an integer "0" may be stored in the data field to represent that the contents of the macro-block is not referenced by one or more other macro-blocks. Alternatively, a non-zero integer may be stored in the data field to represent that one or more other macro-blocks (included in other video packets) depend upon the contents of this video packet. Thus, if a video packet is lost that contains a non-zero integer in this header field, the video picture monitor designates the content of the subsequent dependent macro-blocks as lost. However, even if some macro-blocks are lost, a partial picture may be produced by decoding the detected macro-blocks.

Other compression formats may also implement segmenting pictures into macro-blocks. For example, packet streams that implement MPEG-1 and MPEG-2 are typically broken into groups of video sequences. Each video sequence is composed of a series of pictures that are known as Groups of Pictures (GOP's) and each GOP is composed of a series of pictures. Each picture includes one or more macro-blocks and one or more of the macro-blocks may be grouped to form a slice. For MPEG-4, transported packet streams that implement RTP use the Combined Configuration/Elementary stream mode. A video sequence is treated as a collection of one or more video objects. An instance of a video object at a particular point in time is called a Video Object Plane (VOP). Typically for many simple profiles (Simple, Advanced Simple and Advanced Real Time Simple) each VOP represents a rectangular frame of video. Each VOP includes a series of video packets that each include one or more macro-blocks. The H.264 format encodes a rectangular frame (of progressive or interlaced video) or a field of interlaced video to produce a coded picture. A coded picture may be used as a reference for inter-coding of future coded pictures. If used in this manner, the picture is designated a reference picture. Reference pictures may be organized into one or two lists that are typically identified as list 0 and list 1. A coded picture consists of a number of macro-blocks that are arranged into slices. Similar to pictures, slices may be designated as I-slices, P-slices, and B-slices. An I-slice may contain only I-type macro-blocks while a P-slice may contain P- and I-type macro-blocks. Similarly, B-slices may contain B- and I-type macro-blocks.

Figure 6:
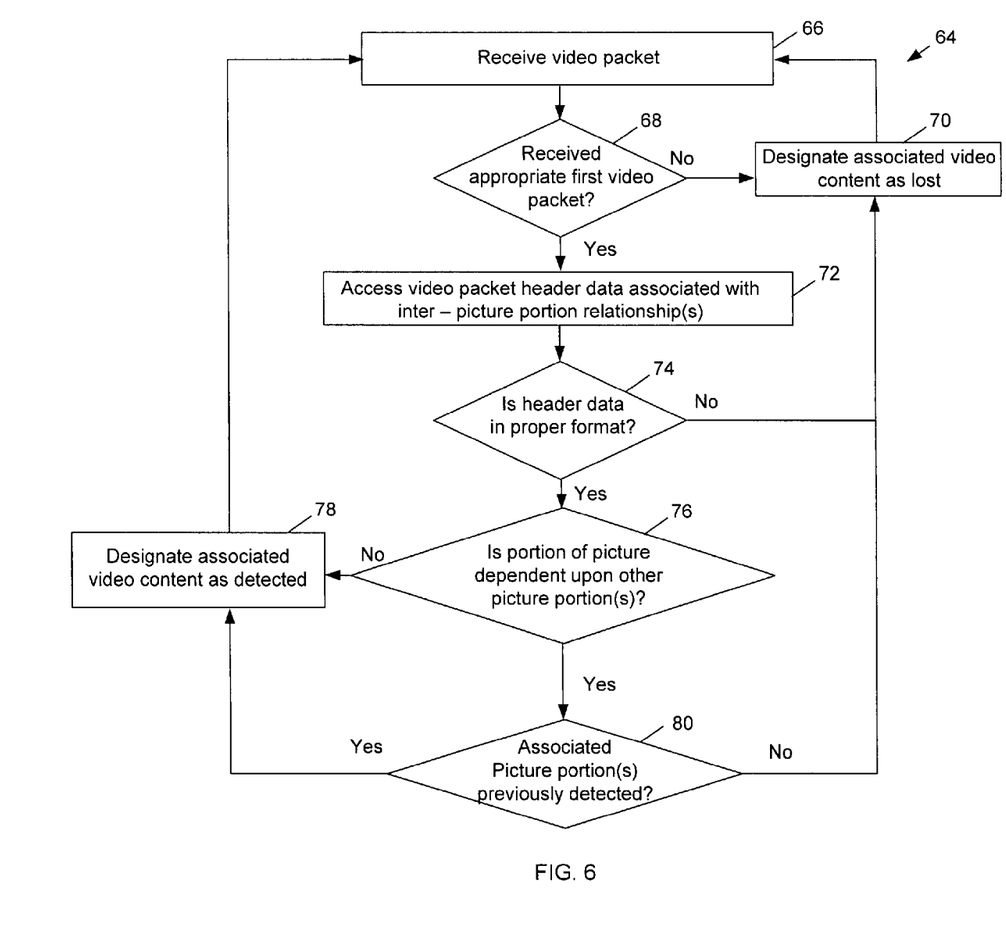
FIG. 6 is a flow chart that represents some operations of a video picture monitor that identifies inter-packet relationships.

Referring to FIG. 6, a flow chart 64 presents some of the operations performed by a video picture monitor such as video picture monitors 34 and 36 (shown in FIG. 2). As mentioned above, the video picture monitor may be executed by a destination computer system (that receives a sequence of video packets) to monitor the viewing experience of an end user. Also, the video picture monitor may be executed by another computer system (or multiple computer systems) to monitor packet loss between the source of the video packets (e.g., computer system 12) and the one or more destinations (e.g., computer system 16) of the video packets. Independent of its location, the video picture monitor receives 66 a video packet to determine the relationship between picture content in the received packet and other picture content received by the computer system. Receiving the video packet may include receiving the video packet as it arrives at the computer (e.g., from network 10) or receiving the video packet as it is retrieved from a storage device (e.g., storage device 26).

The video picture monitor determines 68 if the received packet is the appropriate first video packet in a sequence of video packets. For example, for MPEG-1 and MPEG-2 formats, the first packet in a sequence of video packets typically includes data that represents basic information such as the size of the video sequence (e.g., height, width, etc.), the frame rate, and other similar information. If the first packet that includes this information is not received, video content associated with each packet that is received (along with the packet itself) is designated 70 as lost until this first packet is received. Similarly for an MPEG-4 format, decoding is not initiated until an RTP packet is received that contains configuration information (e.g., Visual Object Sequence Header, Visual Object Header, Video Object Layer Header, etc.). Packets (along with the contained video content) that are received before a packet that contains these headers are designated as lost 70. In some applications this delay may increase wait time until a video stream is presented. For example, in an interactive application, if the first packet containing this information is lost, video presentation is halted until the configuration information is received. For the H.264 format, parameter sets such as a sequence parameter set (applicable to coded video sequences) and picture parameter set (applicable to a sequence of coded pictures) may be contained in a first packet. If this first packet is not received (along with the correspondingly information), content of received packets is designated as lost 70 until receipt of this first packet. Alternatively, for each of these exemplary formats, this configuration information may be provided by a dedicated signal or channel, or by other similar methodologies known to one skilled in the art of video streaming over a network.

The video picture monitor also accesses 72 the header portion of the received video packet to retrieve data that represents the dependence among the picture(s) (or picture portions) in the received packet and one or more pictures (or picture portions) in other video packets. By interrogating the retrieved header data, the video monitor may determine 74 if the retrieved header data is properly formatted. For example, the video picture monitor may determine if the retrieved data appears to comply with the compression format used to transmit the video packet. If the data is not properly formatted, for this exemplary video picture monitor, the video content associated with the picture (or picture portion) is designated 70 as lost and the content of the picture (or picture portion) is not decoded and not used for presentation. After designating the picture (or picture portion) as lost, the video picture monitor returns to receive 66 another packet.

If the header data is properly formatted, the video picture monitor determines 76 if the content of the picture (or picture portion) is dependent upon content contained in another picture or picture portion. For example, the video picture monitor may determine the received video packet contains a P-picture or a B-picture and that packet complies with one of the MPEG standards. Further, the video picture monitor may determine from header data that decoding the content of the video packet is dependent upon video content stored in another video packet or a portion of the same packet. If the content of the received video packet is not dependent upon the contents of another video packet (or portion of the same packet) (e.g., the received video packet contains an I-picture), the video picture monitor designates 78 the video content as detected.

If the contents of the received packet does depend on the contents of another picture (or portion of a picture), the video picture monitor determines 80 if this associated picture (or picture portion) has been detected. If the associated picture (or picture portion) has been detected, the dependent content may be used for decoding the contents of the received packet. Thereby, the video picture monitor designates 78 the video content associated with the received video packet as detected. If the associated picture (or picture portion) has not been detected, the video content of the received video packet may not be properly decoded and the video picture monitor designates 70 the picture (or picture portion) associated with the received packet as lost. After designating the video content of the received packet as detected or lost, the video picture monitor returns to receive 66 another video packet and continues.

By quantifying the lost video content based on lost video packets and inter-picture (and/or inter-picture portion) relationships, a figure of merit may be produced to quantify the quality of a video session that is experienced by an end user. For example, a numerical integer between two and ten may be computed to represent the quality of a video session. This integer may be used as an independent video quality metric, or, in other arrangements, the integer may be used as a baseline to compare against future and/or previously computed video quality metrics.

Along with video content loss (determined from packet loss and inter-picture and/or inter-picture portion relationships), other factors may be included in determining a figure of merit. For example, factors such as latency and jitter may be incorporated into a metric calculation. In general, latency may include encoder delay, delays experienced by IP stacks (transmit and/or receive), network delay, jitter buffer delay, and delay introduced by a decoder. Dependent upon the application, latency may be experienced due to uni-directional transmitting of video content (e.g., video-on-demand services, broadcast video applications, etc.) or by bi-directional transmission (e.g., interactive video applications).

As mentioned, similar to latency, jitter may be included as a factor to calculate a video session figure of merit. In general, jitter may be defined as the variance of latency in a network. To offset the affects of jitter, buffers may be positioned at certain locations within a network (e.g., at network endpoints, etc.) so that buffered packets may be accessed at substantially the same rate at which they are transmitted. However, the introduction of these buffers affect the quality of a presented video session. For example, to combat a significant amount of jitter, a relatively large buffer may need to be introduced that may introduce additional latency. Furthermore, these buffers may discard packets that arrive after a predefined arrival time threshold. By discarding video packets, the overall packet loss may be increased due to these buffers. Thus, by including jitter and latency with loss content, a figure of merit that represents the video experience provided to an end user is more accurately calculated.

A number of implementations have been described. Nevertheless, it will be understood that various modifications may be made. Accordingly, other implementations are within the scope of the following claims.

What is claimed is:

1. A method of monitoring video packets for quantifying video quality, comprising:
   accessing data in a portion of a header of a first video packet included in a sequence of video packets, wherein the header is separate from video content stored in the first video packet; and
   determining from the accessed data, an inter-packet relationship between a portion of a picture included in the first video packet and at least a portion of a picture included in a second video packet that is included in the sequence of video packets based on picture types of a compression technique associated with the sequence of video packets, wherein the inter-packet relationship indicates whether to use a portion of the video content stored in the first video packet.

2. The method of claim 1, further comprising:
   determining from the accessed data, a relationship between a portion of the picture included in the first video packet and a portion of a picture included in a third video packet that is included in the sequence of video packets.

3. The method of claim 1, further comprising:
   designating the video content portion of the first video packet as lost based on the relationship between the picture portions included in the video packets.

4. The method of claim 1, further comprising:
designating the portion of the first video packet as lost based on the relationship between the picture portions included in the video packets and the absence of the second video packet.

5. The method of claim 1, further comprising:
designating the portion of the first video packet as detected based on the relationship between the picture portions included in the video packets.

6. The method of claim 1, further comprising:
designating the portion of the first video packet as detected based on the relationship between the picture portions included in the video packets and the detection of the second video packet.

7. The method of claim 1, wherein accessing the data in the portion of the header of the first video packet includes identifying a type of picture contained in the first video packet.

8. The method of claim 1, wherein accessing the data in the portion of the header of the first video packet includes identifying a macro-block contained in the first video packet.

9. The method of claim 1, wherein the portion of the picture in the second video packet includes an independent picture, a dependent picture, an I-picture, a P-picture, or a B-picture.

10. The method of claim 4, wherein the first video packet includes a P-picture and the second video packet includes an I-picture or a P-picture.

11. The method of claim 3, further comprising:
designating a portion of a third video packet that is included in the sequence of video packets as lost unless the third video packet includes an I-picture.

12. The method of claim 1, wherein the portion of the picture in the first packet and the portion of the picture in the second packet are included in the same picture or in separate pictures.

13. The method of claim 1, wherein the portion of the picture in the first packet includes a macro-block.

14. The method of claim 1, wherein the sequence of video packets are received by a destination computer system.

15. The method of claim 1, wherein the sequence of video packets are received by a computer system, different from a destination computer system of the sequence of video packets.

16. The method of claim 1, wherein the sequence of video packets is compressed.

17. The method of claim 1, wherein the sequence of video packets is compressed to comply with an MPEG format, an H.264 format, or a Window Media Video format.

18. The method of claim 1, wherein the second video packet is located before the first video packet in the sequence of video packets.

19. A system for monitoring a sequence of video packets for quantifying video quality, comprising:
a video picture monitor configured to access data in a portion of a header of a first video packet included in the sequence of video packets, wherein the header is separate from video content stored in the first video packet, the video picture monitor is also configured to determine from the accessed data, an inter-packet relationship between a portion of a picture included in the first video packet and at least a portion of a picture included in a second video packet that is included in the sequence of video packets based on picture types of a compression technique associated with the sequence of video packets, wherein the inter-packet relationship indicates whether to use a portion of the video content stored in the first video packet.

20. A non-transitory computer readable medium encoded with a computer program product having a plurality of instructions, when executed by a processor, cause that processor to:
access data in a portion of a header of a first video packet included in a sequence of video packets, wherein the header is separate from video content stored in the first video packet; and
determine from the accessed data, an inter-packet relationship between a portion of a picture included in the first video packet and at least a portion of a picture included in a second video packet that is included in the sequence of video packets based on picture types of a compression technique associated with the sequence of video packets, wherein the relationship indicates whether to use a portion of the video content stored in the first video packet to quantify video quality.

* * * * *